US009430389B2

(12) United States Patent
Corbal et al.

(10) Patent No.: US 9,430,389 B2
(45) Date of Patent: Aug. 30, 2016

(54) PREFETCH WITH REQUEST FOR OWNERSHIP WITHOUT DATA

(75) Inventors: Jesus Corbal, Barcelona (ES); Lisa K. Wu, New York, NY (US); George Z. Chrysos, Portland, OR (US); Andrew T. Forsyth, Kirkland, WA (US); Ramacharan Sundararaman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,429

(22) PCT Filed: Dec. 22, 2011

(86) PCT No.: PCT/US2011/066854
§ 371 (c)(1),
(2), (4) Date: Jan. 23, 2014

(87) PCT Pub. No.: WO2013/095511
PCT Pub. Date: Jun. 27, 2013

(65) Prior Publication Data
US 2014/0164705 A1    Jun. 12, 2014

(51) Int. Cl.
G06F 3/00      (2006.01)
G06F 12/08     (2016.01)
G06F 9/30      (2006.01)

(52) U.S. Cl.
CPC ....... *G06F 12/0815* (2013.01); *G06F 9/30047* (2013.01); *G06F 12/0811* (2013.01); *G06F 12/0862* (2013.01)

(58) Field of Classification Search
None
See application file for complete search history.

(56) References Cited

U.S. PATENT DOCUMENTS

| 4,775,955 A * | 10/1988 | Liu ..................... G06F 12/0837 711/135 |
| 6,842,826 B1 * | 1/2005 | McNutt ......................... 711/136 |
| 6,865,645 B1 * | 3/2005 | Shum .................... G06F 9/3812 711/123 |
| 7,284,097 B2 | 10/2007 | Dodson et al. |
| 7,546,422 B2 * | 6/2009 | George ................. G06F 12/082 711/129 |
| 2002/0078305 A1 | 6/2002 | Khare et al. |
| 2002/0124143 A1 * | 9/2002 | Barroso ............. G06F 11/1064 711/145 |
| 2004/0088487 A1 | 5/2004 | Barroso et al. |
| 2007/0088919 A1 * | 4/2007 | Shen et al. ..................... 711/154 |

FOREIGN PATENT DOCUMENTS

CN         1495618 A      5/2004

OTHER PUBLICATIONS

PCT International Search Report for PCT Counterpart Application No. PCT/US2011/066854, 3 pgs., (Jul. 27, 2012).

(Continued)

*Primary Examiner* — Elias Mamo
(74) *Attorney, Agent, or Firm* — Nicholson De Vos Webster & Elliott, LLP

(57) ABSTRACT

A method performed by a processor is described. The method includes executing an instruction. The instruction has an address as an operand. The executing of the instruction includes sending a signal to cache coherence protocol logic of the processor. In response to the signal, the cache coherence protocol logic issues a request for ownership of a cache line at the address. The cache line is not in a cache of the processor. The request for ownership also indicates that the cache line is not to be sent to the processor.

22 Claims, 8 Drawing Sheets

(56) References Cited

OTHER PUBLICATIONS

PCT Written Opinion of the International Searching Authority for PCT Counterpart Application No. PCT/US2011/066854, 3 pgs., (Jul. 27, 2012).

PCT Notification concerning Transmittal of Copy of International Preliminary Report on Patentability (Chapter I of the Patent Cooperation Treaty) for PCT Counterpart Application No. PCT/US2011/066854, 5 pgs., (Jul. 3, 2014).

Chrysos, George, "Under the Armor of Knights Corner: Intel MIC Architecture at Hotchips 2012." Intel Communities The Data Stack blog, https://communities.intel.com/community/datastack/blog/2012/08/30/knights-corner-at-hot-chips-24, Aug. 30, 2012, 3 pages.

Chrysos, George, "Intel® Xeon Phi™ Coprocessor—the Architecture." Intel Developer Zone webpage, http://software.intel.com/en-us/articles/intel-xeon-phi-coprocessor-codename-knights-corner, 2012, 9 pages.

Office Action and Search Report with English Translation from Taiwan Patent Application No. 101148094, mailed Mar. 18, 2015, 14 pages.

Office action with English translation from Chinese Patent Application No. 201180076288.5, mailed Mar. 30, 2016, 21 pages.

* cited by examiner

US 9,430,389 B2

PREFETCH WITH REQUEST FOR OWNERSHIP WITHOUT DATA

CROSS-REFERENCE TO RELATED APPLICATION

This patent application is a U.S. National Phase Application under 35 U.S.C. §371 of International Application No. PCT/US2011/066854, filed Dec. 22, 2011, entitled PREFETCH WITH REQUEST FOR OWNERSHIP WITHOUT DATA.

BACKGROUND

1. Field of Invention

The field of invention relates generally to the computing sciences and more specifically to a prefetch with request for ownership without data.

2. Background

FIG. 1 shows a processor 100 having a plurality of processor cores 101_1 to 101_N. Each of the cores has its own respective L1 cache 102_1 to 102_N but shares a common system memory 103. The collective goal of the L1 caches 102_1 to 102_N is to minimize accesses to the shared memory 103 by keeping a data item in the cache of a core that is apt to operate on it. However, as it is entirely possible that the respective program code running on the different cores 101_1 to 101_N may wish to concurrently operate on a same item of data, a "coherency" protocol is implemented to ensure that an item of data remains "consistent" within the computing system as a whole.

A commonly used coherency protocol is the MESI protocol. The MESI protocol assigns one of four different states to any cached item: 1) Modified (M); 2) Exclusive (E); 3) Shared (S); and, 4) Invalid. A cache line in the M state corresponds to a "dirty" cache line that includes recent, updated data that has not yet been updated to shared memory. A cache line in the E state corresponds to data that is "clean". That is, its data content is the same as its corresponding entry (i.e., same address) in shared memory. When a processor writes new data to a cache line in the E state, the state of the cache line is changed to the M state. When a cache line is in the M state, the updated data must be written back to shared memory before a read of shared memory is permitted at the cache line's corresponding address. The write back to memory causes the cache line to transition from the M state to the E state.

A cache line in the S state typically corresponds to a cache line having multiple copies across the various caches 102_1 to 102_N. In a typical situation, a single instance of a cache line is resident in the E state in the cache of a particular processor. If another processor desires the same cache line, a second copy of the cache line is sent to the requesting processor. The state of the cache line therefore changes from E to S as there are now two copies of the cache line in the system. Other aspects of the MESI protocol exist. However such features are well know and need not be discussed here.

If any of the processors 101_1 to 101_N desires to write to a copy of a cache line in the S state, the processor that desires to perform the write issues a request for ownership (RFO) for the cache line that is broadcast to the other processors. If the RFO is granted, any other copies of the cache line in the caches of the other processors are invalidated (i.e., change from the S to I state).

If the processor that was grated the RFO has a local copy of the cache line in the S state, the grant of the RFO transitions the state of the local copy to the E state, and, the subsequent write changes the state again from the E state to the M state. If the processor that was granted the RFO did not have a local copy of the cache line when the RFO was issued, as part of the grant of the RFO it is provided with a copy of the cache line from one of the other processors that has a copy. The cache line is initially held in the E state. The subsequent write transitions the cache line from the E state to the M state.

When a processor issues an RFO for a cache line that it desires to write to but does not currently have a copy of in its own cache, there is no guarantee that the desired cache line is in any of the other caches. In this case, where no instance of the desired cache line exists in any of the other caches, the cache line is fetched from shared memory and provided to the requesting processor's cache in the E state.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Overview

Recall from the discussion in the background that there is no guarantee that a desired cache line is in the cache of another processor when a processor issues an RFO to write to a cache line that it does not currently have in its own local cache. In this case, referred to as a "cache miss", the cache line is fetched from shared memory and entered into the requesting processor's cache.

This operation corresponds to an inefficiency however when the requesting processor intends to write to the full cache line (rather than write to the cache line partially). Here, a cache line is typically organized into different separately addressable sections (e.g., bytes). At least in circumstances where the processor intends to write new data to each of these separately addressable sections, it serves no purpose to fetch the cache line from shared memory in the case of a cache miss. That is, because the processor intends to completely overwrite each section with new data, it serves no useful purpose to waste memory bandwidth resources fetching data that will be completely overwritten.

Figure 1:
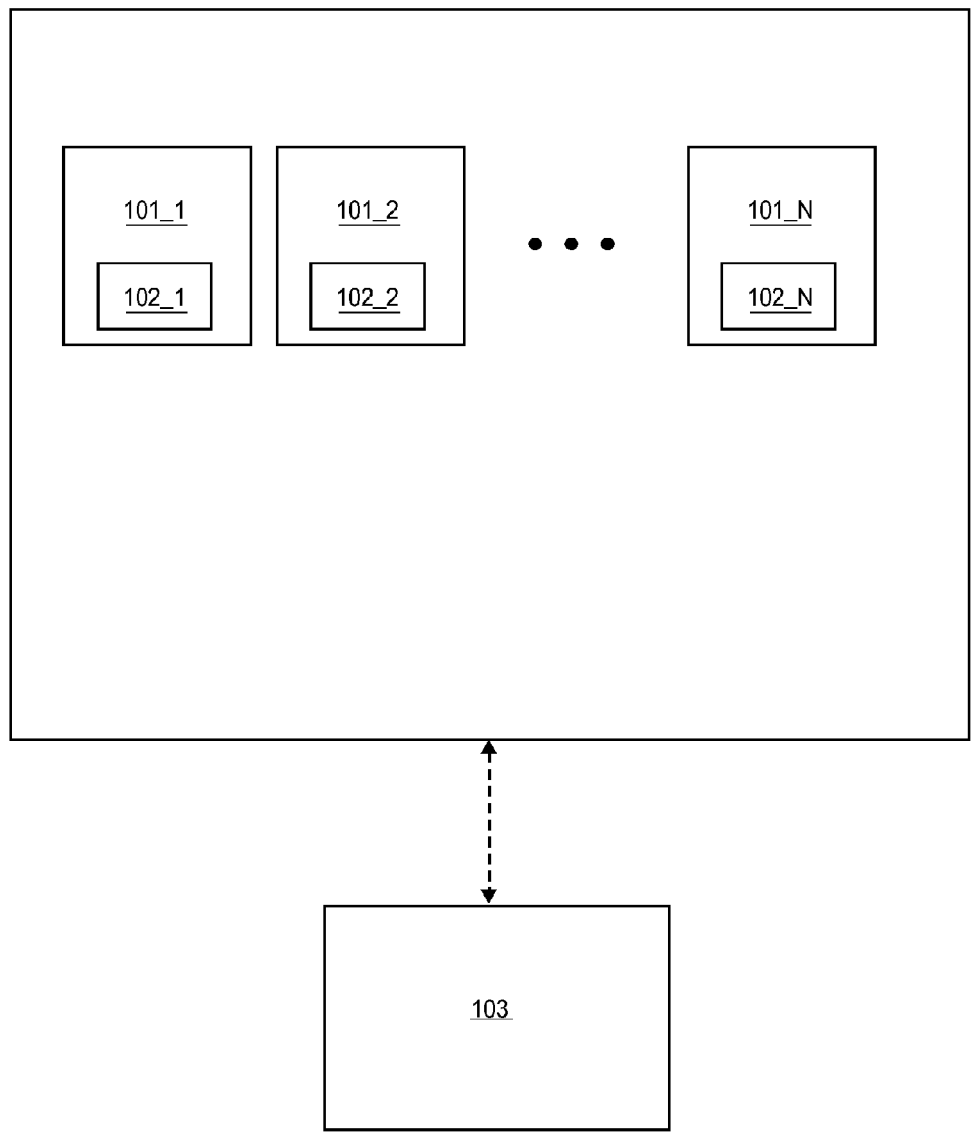
FIG. 1 shows a plurality of processors and a system memory.
Figure 2:
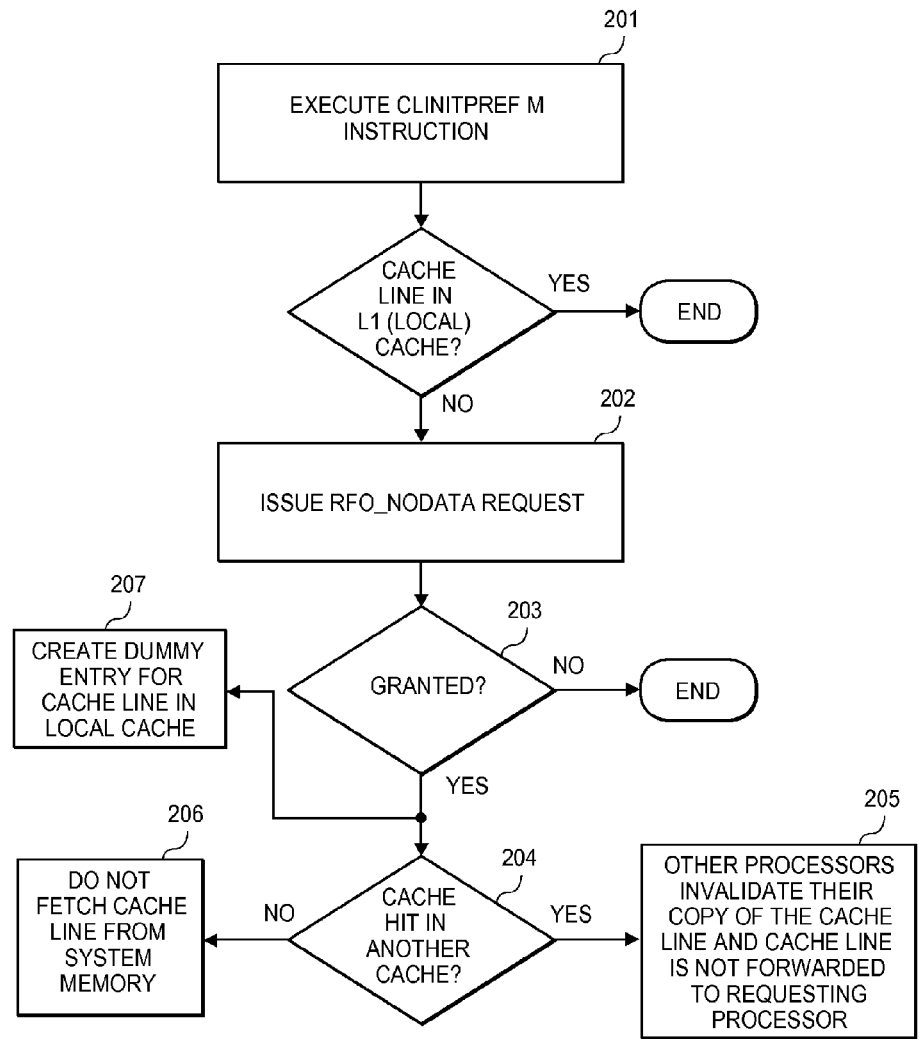
FIG. 2 shows a method for issuing an RFO_NODATA request.

FIG. 2 pertains to an improved approach in which the processing core's instruction set includes an instruction that the program code can call if it believes it will overwrite an entire cache line. According to the approach of FIG. 2, the processing cores of a multi core processor support an instruction CLINITPREF M that acts as a hint to the hardware to prefetch a cache line at address M.

A processing core that executes the CLINITPREF M instruction first checks its own cache 201 for the cache line and if it is there (cache hit) the process ends. If the cache line is not in the processor's local cache (local cache miss), the processor issues an RFO_NODATA to the other processing cores 202. If the RFO_NODATA is granted 203 and there is a cache hit in another cache 204 (i.e., at least one of the other processing cores has the cache line in its local cache) the other processors invalidate their local copies of the cache line. However, unlike a traditional granted RFO and cache hit, the cache line is not provided to the requesting processing core 205. Similarly, if the RFO_NODATA is granted 203 and the cache line is not resident in any of the other processing cores' respective caches (cache miss), the requested cache line is not fetched from memory 206.

Rather, in an embodiment, a dummy entry is created 207 in the cache of the processor that issued the RFO_NODATA for the requested cache line without any "real" data. Ideally, the processor completely writes over the dummy cache line entry through execution of a subsequent store instruction before any other access of the cache line is desired (e.g., a read or partial write). Here, the refusal to forward the cache line to the requesting core and the creation of the dummy entry in lieu thereof saves bandwidth/communication resources between the protocol agents and between the protocol agents and system memory.

The dummy entry can be viewed as having a new state that is added to the traditional set of MESI states in the MESI coherency protocol. Specifically, the dummy entry can be viewed as being in the N state: an Exclusive state with the further understanding that the cache line has no data (recall that, traditionally, a granted RFO resulted in the only remaining copy of the cache line being placed in the E state).

Figure 3:
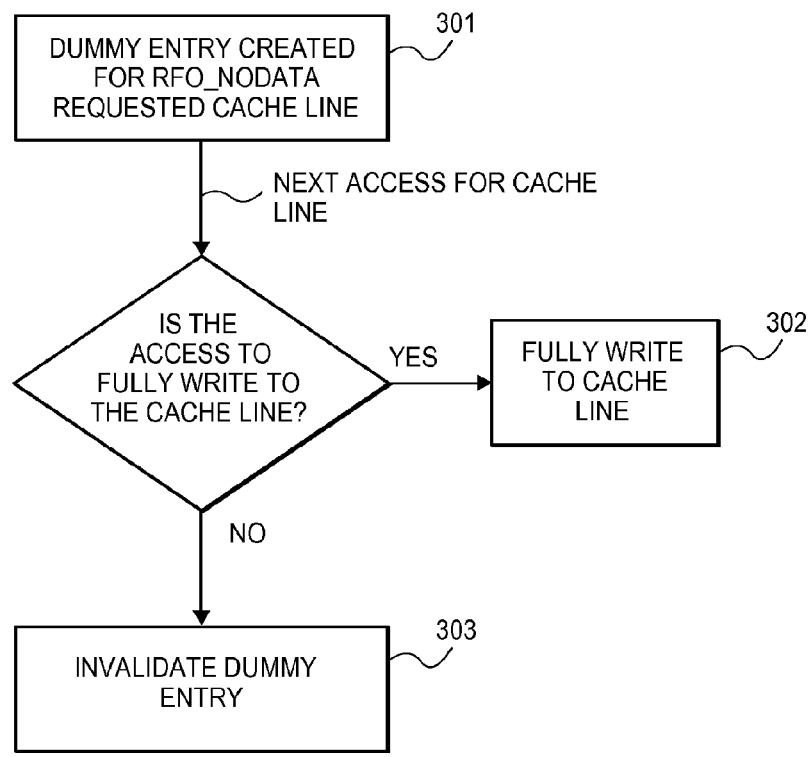
FIG. 3 shows a method for handling an entry in cache created after a grant of an RFO_NODATA request.

With the understanding that the cache line has no data, protocol agent behavior is different than if the cache line were in a traditional E state. Specifically, as observed in FIG. 3, the processing core that has the dummy entry 301 invalidates the dummy entry 303 if the processing core is unable to execute a store instruction that completely overwrites the cache line 302 before it executes a load instruction to read the dummy entry or executes a store instruction that only partially writes the cache line 303. Moreover, if a read or RFO request is made for the dummy cache line by another processor, rather than transition the cache line to the S state and service the read/RFO request (i.e., send the requesting processor a copy of the cache line), instead, the dummy cache line is invalidated (transitions to the I state) and the request is not serviced. This forces the requesting processor to receive the cache line from memory in the E state.

Note that in various embodiments the CLINITPREF M instruction can be viewed as a type of prefetch instruction that effectively prepares the system for a complete overwrite of the cache line at address M without enduring the penalty of enduring a cache line transfer between protocol agents or over a system memory interface where the cache line is question stands to be completely overwritten. As such, the CLINITPREF M instruction is particularly useful in the compilation of program code.

Figure 4:
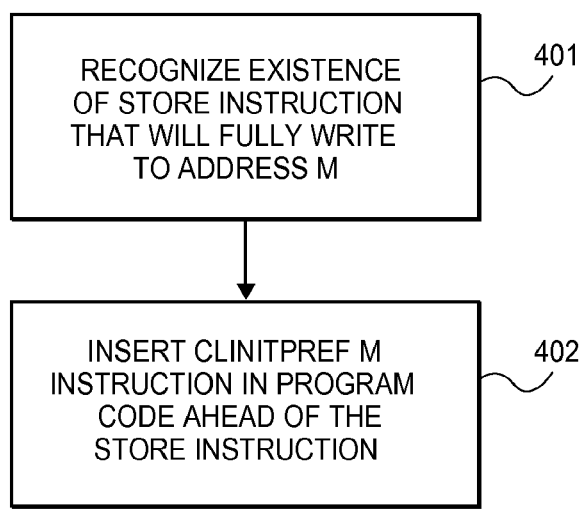
FIG. 4 shows a program code compilation process for inserting a CLINITPREF M instruction that causes hardware to issue an RFO_NODATA request.

Here, referring to FIG. 4, if a compiler recognizes 401 the existence of a store instruction that will completely overwrite a cache line, the compiler can insert a CLINITPREF instruction into the code in advance of the store instruction 402. As such, during runtime, first the CLINITPREF instruction is executed which has the effect of: i) invalidating any shared copies of the affected cache line in other processing cores; ii) giving exclusive ownership of the cache line to the processing core that will completely overwrite the cache line; and, iii) creating a dummy entry in the processing core's cache so that it will handle the store operation as a cache hit in its local cache.

Note that various embodiments consistent with the ideas presented above are possible. For example, the approach of FIG. 2 avoids the penalty of both a cache line transfer between cores a cache line transfer over a system memory interface in the case where a processing core is about to completely overwrite the cache line.

In an alternate embodiment that may be implemented, for example, to impose less sophisticated coherency protocol logic at the expense of system performance, only the penalty of a cache line transfer across a system memory interface is avoided. That is, when the requesting processing core issues an RFO_NODATA request, the "no data" part is adhered to at the component of the coherence protocol logic that controls system memory accesses but not the components of the coherence protocol logic associated with the local caches of the individual cores.

As such, when a processing core issues an RFO_NODATA request, if another processing core has the cache line in its local cache, the cache line is forwarded from the processing core having the cache line to the processing core that requested the cache line. If a cache miss occurs across the local caches of all the processing cores, the coherency logic that controls access to the system memory understands that even though a normal cache miss should trigger a read of system memory, in the case of an RFO_NODATA, no such read should be made.

Figure 5:
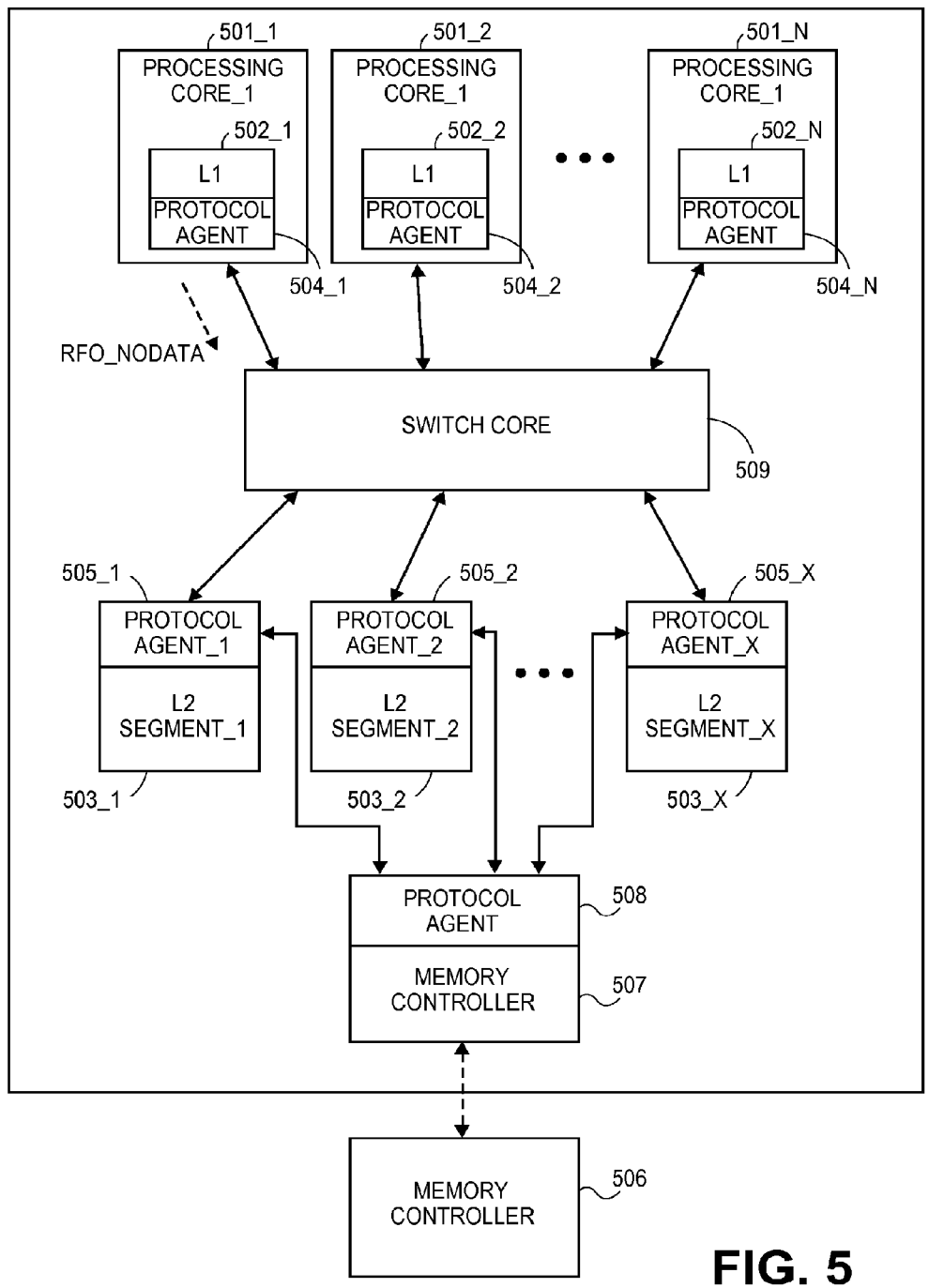
FIG. 5 shows a multiprocessor semiconductor chip having caching and system memory protocol agents capable of handling an RFO_NODATA request.

In another approach hints are provided in the instruction to dictate how far the requested cache line should move towards the requesting processing core in the case of (e.g., multiple) cache misses. For example, FIG. 5 shows a multi-processor chip having multiple processing cores 501_1-501_N (each with its own local L1 cache 502_1-502_N), and an L2 caching layer that consists of different L2 cache "slices" 503_1-503_X where each slice is responsible for caching a different address and has its own associated coherence plane logic. Switch core 509 interconnects the processing cores to the L2 cache agents and the system memory controller 507. Both the L1 caches, the L2 cache slices and a system memory controller 507 have their own respective protocol agent logic circuitry 504_1-504_N, 505_1-505_X, 508 for implementing the RFO_NODATA protocol and N state consistent with the teachings provided herein.

Note that any of the above described embodiments can be implemented in a system as observed in FIG. 5. Specifically, the system of FIG. 5 operates as described above except that a miss in all L1 caches 502_1 to 502_N in response to an RFO_NODATA request causes a snoop into L2 cache. In a first embodiment, if there is a hit in L2 cache, the copy in L2 cache is invalidated and not forwarded to the requesting processor. In an alternate embodiment, the copy in L2 cache is invalidated but is forwarded to the requesting processor. The alternate embodiment wastes communication resources 509 between the L2 cache and the processors but keeps the logic of the L2 caching agent less complex than the first embodiment. If there is a miss in L2 cache, the process proceeds toward system memory 506 as just described. Specifically, the system memory protocol agent 508 can be designed to behave like a L2 cache protocol agent described above according to either embodiment.

Consistent with these options, in further embodiments, a hint is provided in the CLINITPREF M instruction that specifies data movement of the cache line within the processor. That is, the system may be designed to support each of the embodiments discussed above, and, which embodiment is to take effect is specified in the instruction. Specifically, the instruction may take the form of CLINITPREF M h where h is a temporal hint that dictates whether the L2 caching protocol agent is to, upon a hit in L2 cache, move the cache line that is the subject of the RFO_NODATA up into the L1 cache or not move the cache line into the L1 cache.

Separately or in combination the temporal hint h may also specify whether the system memory protocol agent 508, upon an L2 cache miss, should fetch the cache line from system memory 506 or not fetch the cache line from system memory 506. In a further embodiment, if the system memory protocol agent 508 is to fetch the cache line from system memory 506, the cache line only moves up into L2 cache and is not passed all the way up to the requesting processor. This has the effect of saving communication resources 509 between the L2 cache and the processors (but not the system memory bus). In an embodiment the temporal hint information h is specified in an immediate operand of the instruction.

Figure 6:
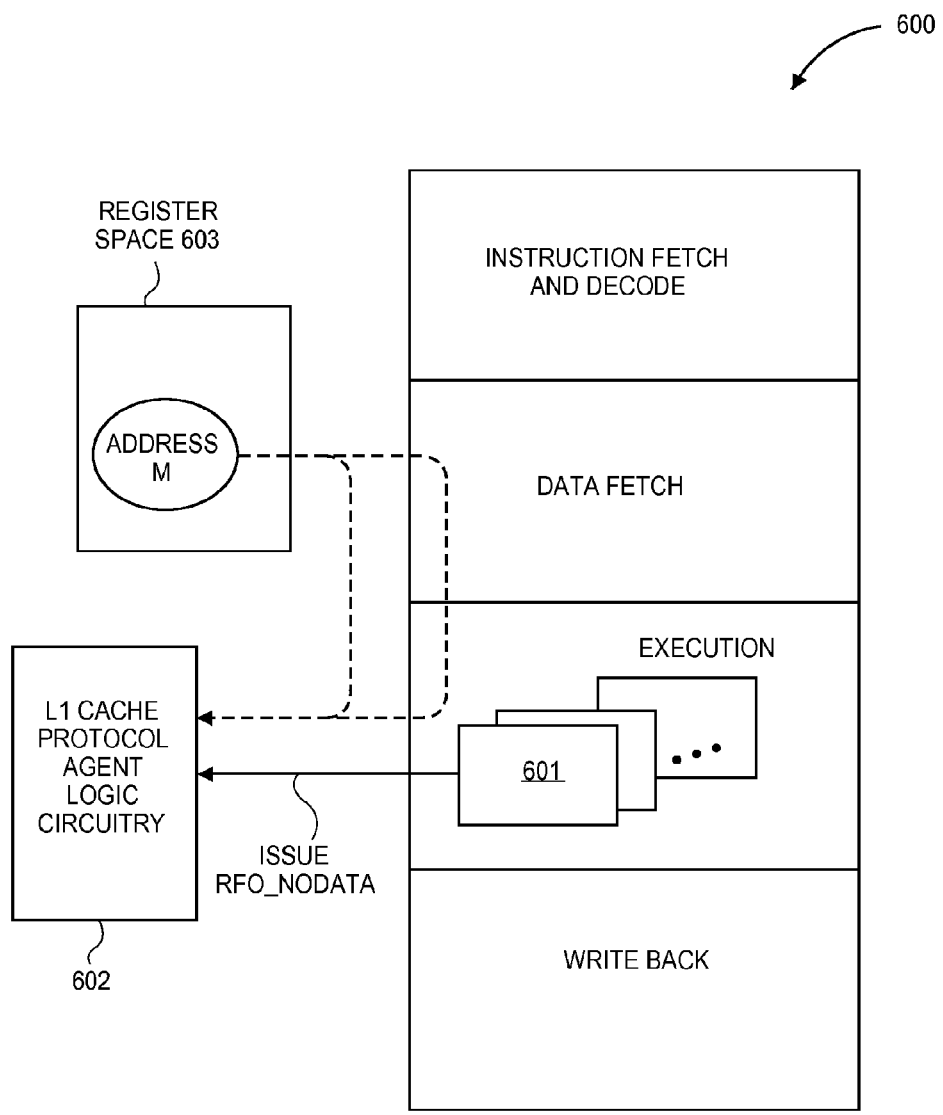
FIG. 6 shows a processing core pipeline capable of executing a CLINTPREF M instruction.

FIG. 6 shows an instruction execution pipeline 600 having at least one execution unit 601 that is coupled to the (e.g., L1) cache coherence logic 602 of the processing core having the pipeline. In an embodiment, in response to the execution of a CLINITPREF M instruction, a signal is sent from the execution unit 601 to the cache coherence logic 602 that triggers the issuance of a RFO_NODATA for the address M specified in the instruction. The signal therefore includes some indication that the RFO_NODATA should be issued as well as the address M. The address M may be routed to the L1 cache coherence logic from general purpose register space 603 where the address M is kept as an input operand for the instruction. The address M may be routed directly to the cache protocol agent logic 602 from register space 603 or may be routed through the pipeline 600. In the case of CLINITPREF M h instructions containing temporal hint information, the temporal hint information is also passed from the execution unit 601 to the cache coherence logic 602 which embeds the information in the RFO_NODATA request.

Figure 7:
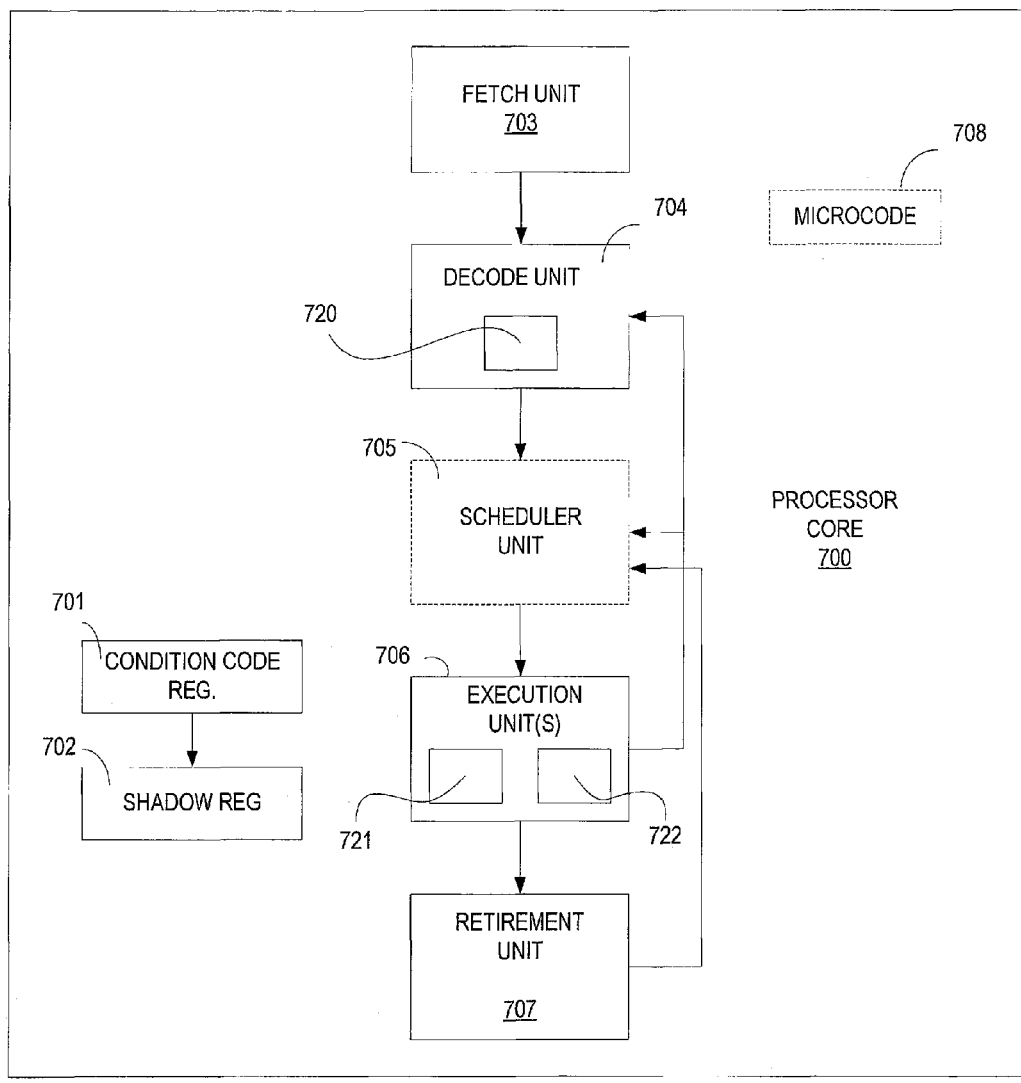
FIG. 7 shows a more detail processing core pipeline.

FIG. 7 shows a generic processing core 700 that is believed to describe many different types of processing core architectures such as Complex Instruction Set (CISC), Reduced Instruction Set (RISC) and Very Long Instruction Word (VLIW). The processing core of FIG. 7 can be coupled to L1 cache agent protocol logic and register space as depicted in FIG. 6 to support execution of a CLINITPREF M instruction.

The generic processing core 700 of FIG. 7 includes: 1) a fetch unit 703 that fetches instructions (e.g., from cache or memory); 2) a decode unit 704 that decodes instructions; 3) a schedule unit 705 that determines the timing and/or order of instruction issuance to the execution units 706 (notably the scheduler is optional); 4) execution units 706 that execute the instructions; 5) a retirement unit 707 that signifies successful completion of an instruction. Notably, the processing core may or may not include microcode 708, partially or wholly, to control the micro operations of the execution units 706. The instruction execution resources/logic referred to in preceding discussions may be implemented with one or more of the execution units within execution units 706.

Figure 8:
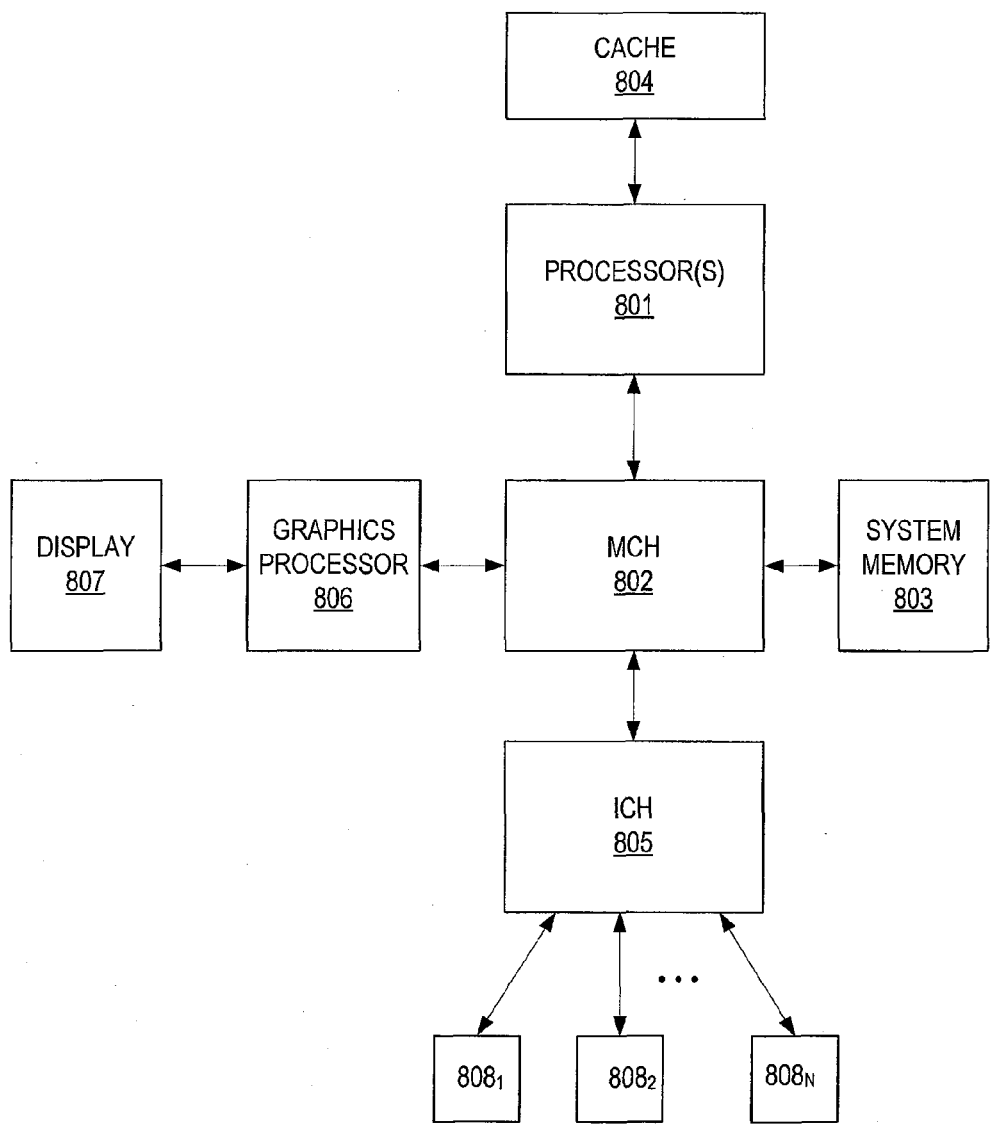
FIG. 8 shows a computing system

A processing core having the functionality described above can be implemented into various computing systems as well. FIG. 8 shows an embodiment of a computing system (e.g., a computer). The exemplary computing system of FIG. 8 includes: 1) one or more processing cores 801 that may be designed to include two and three register scalar integer and vector instruction execution; 2) a memory control hub (MCH) 802; 3) a system memory 803 (of which different types exist such as DDR RAM, EDO RAM, etc); 4) a cache 804; 5) an I/O control hub (ICH) 805; 6) a graphics processor 806; 7) a display/screen 807 (of which different types exist such as Cathode Ray Tube (CRT), flat panel, Thin Film Transistor (TFT), Liquid Crystal Display (LCD), DPL, etc.) one or more I/O devices 808.

The one or more processing cores 801 execute instructions in order to perform whatever software routines the computing system implements. The instructions frequently involve some sort of operation performed upon data. Both data and instructions are stored in system memory 803 and cache 804. Cache 804 is typically designed to have shorter latency times than system memory 803. For example, cache 804 might be integrated onto the same silicon chip(s) as the processor(s) and/or constructed with faster SRAM cells whilst system memory 803 might be constructed with slower DRAM cells. By tending to store more frequently used instructions and data in the cache 804 as opposed to the system memory 803, the overall performance efficiency of the computing system improves.

System memory 803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 803 prior to their being operated upon by the one or more processor(s) 801 in the implementation of a software program. Similarly, data that a software program determines should be sent from the computing system to an outside entity through one of the computing system interfaces, or stored into an internal storage element, is often temporarily queued in system memory 803 prior to its being transmitted or stored.

The ICH 805 is responsible for ensuring that such data is properly passed between the system memory 803 and its appropriate corresponding computing system interface (and internal storage device if the computing system is so designed). The MCH 802 is responsible for managing the various contending requests for system memory 803 access amongst the processor(s) 801, interfaces and internal storage elements that may proximately arise in time with respect to one another.

One or more I/O devices 808 are also implemented in a typical computing system. I/O devices generally are responsible for transferring data to and/or from the computing system (e.g., a networking adapter); or, for large scale non-volatile storage within the computing system (e.g., hard disk drive). ICH 805 has bi-directional point-to-point links between itself and the observed I/O devices 808.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. A semiconductor chip having multiple processing cores comprising:
    a cache; and
    a processing core of said multiple processing cores comprising cache coherence logic to issue a request for ownership of a cache line of the cache without receipt of the cache line in response to the request, said cache coherence logic to give exclusive ownership of the cache line to the processing core in response to only a full write to the cache line, create a dummy entry for said cache line in said cache in response to said request, invalidate said dummy entry in response to only the full write to said cache line, and not invalidate said dummy entry in response to a read of said cache line, wherein said cache coherence logic is to place the dummy entry for said cache line in said cache in an exclusive with no data state of a cache coherency protocol.

2. The semiconductor chip of claim 1 wherein the exclusive with no data state is not any of modified, exclusive, shared and invalid (MESI) states of the cache coherency protocol.

3. The semiconductor chip of claim 1 wherein the exclusive with no data state is in addition to modified exclusive, shared and invalid (MESI) states of the cache coherency protocol.

4. The semiconductor chip of claim 1 wherein said request includes temporal hint information that determines whether the cache line is to be read from system memory for a cache miss.

5. The semiconductor chip of claim 1 wherein said cache coherence logic is to issue said request in response to execution of a prefetch instruction.

6. The semiconductor chip of claim 1 further comprising L2 cache coherence logic, said L2 cache coherence logic to, in response to said request, not forward said cache line to said processing core for an L2 cache hit, wherein the cache coherence logic is L1 cache coherence logic.

7. The semiconductor chip of claim 1 further comprising system memory coherence logic to, in response to said request, not fetch said cache line from system memory for a cache miss.

8. A method performed by a processor comprising:
    issuing a request for ownership of a cache line of a cache by a processing core of the processor without receiving the cache line in response to the request;
    giving exclusive ownership of the cache line to the processing core in response to only a full write to the cache line;
    creating a dummy entry for said cache line in said cache in response to the issuing;
    invalidating said dummy entry in response to only the full write to said cache line;
    not invalidating said dummy entry in response to a read of said cache line; and
    creating placing the dummy entry for said cache line in said cache in an exclusive with no data state of a cache coherency protocol.

9. The method of claim 8 wherein the exclusive with no data state is not any of modified, exclusive, shared, and invalid (MESI) states of the cache coherency protocol.

10. The method of claim 8 wherein the exclusive with no data state is in addition to modified, exclusive, shared, and invalid (MESI) states of the cache coherency.

11. The method of claim 8 wherein the issuing the request comprises execution of a prefetch instruction.

12. The method of claim 8 further comprising, in response to said issuing, moving said cache line from system memory to a second cache located between said cache and system memory.

13. A semiconductor chip having multiple processing cores comprising: a processing core of said multiple processing cores comprising its own local cache and cache coherence logic, said cache coherence logic to issue a request for ownership of a cache line without receipt of the cache line in response to the request even if said cache line is not in said local cache, the cache coherence logic to give exclusive ownership of the cache line to the processing core in response to only a full write to the cache line, create a dummy entry for said cache line in said local cache in response to said request, invalidate said dummy entry in response to only the full write to said cache line, and not invalidate said dummy entry in response to a read of said cache line, wherein said cache coherence logic is to place the dummy entry for said cache line in said local cache in an exclusive with no data state of a cache coherency protocol.

14. The semiconductor chip of claim 13 wherein the exclusive with no data state is not any of modified, exclusive, shared, and invalid (MESI) states of the cache coherency protocol.

15. The semiconductor chip of claim 13 wherein the exclusive with no data state is in addition to modified, exclusive, shared, and invalid (MESI) states of the cache coherency protocol.

16. The semiconductor chip of claim 13 wherein said request includes temporal hint information that determines whether the cache line is to be read from system memory for a miss in a second cache between said local cache and system memory.

17. The semiconductor chip of claim 13 wherein a said cache coherence logic is to issue said request in response to execution of a prefetch instruction.

18. A semiconductor chip having multiple processing cores comprising:
 a cache; and
 a processing core of said multiple processing cores comprising cache coherence logic to issue a request for ownership of a cache line of the cache without receipt of the cache line in response to the request, said cache coherence logic to give exclusive ownership of the cache line to the processing core in response to only a full write to the cache line, create a dummy entry for said cache line in said cache in response to said request, and place the dummy entry for said cache line in said cache in an exclusive with no data state of a cache coherency protocol.

19. The semiconductor chip of claim 18 wherein the exclusive with no data state is not any of modified, exclusive, shared, and invalid (MESI) states of the cache coherency protocol.

20. The semiconductor chip of claim 18 wherein said cache coherence logic is to invalidate said dummy entry in response to only the full write to said cache line.

21. The semiconductor chip of claim 18 wherein said cache coherence logic is to not invalidate said dummy entry in response to a read of said cache line.

22. The semiconductor chip of claim 18 wherein said cache coherence logic is to issue said request in response to execution of a prefetch instruction.

* * * * *